April 29, 1969 E. H. EASTIN 3,440,931
DEACCELERATION VALVE
Filed Oct. 6, 1967
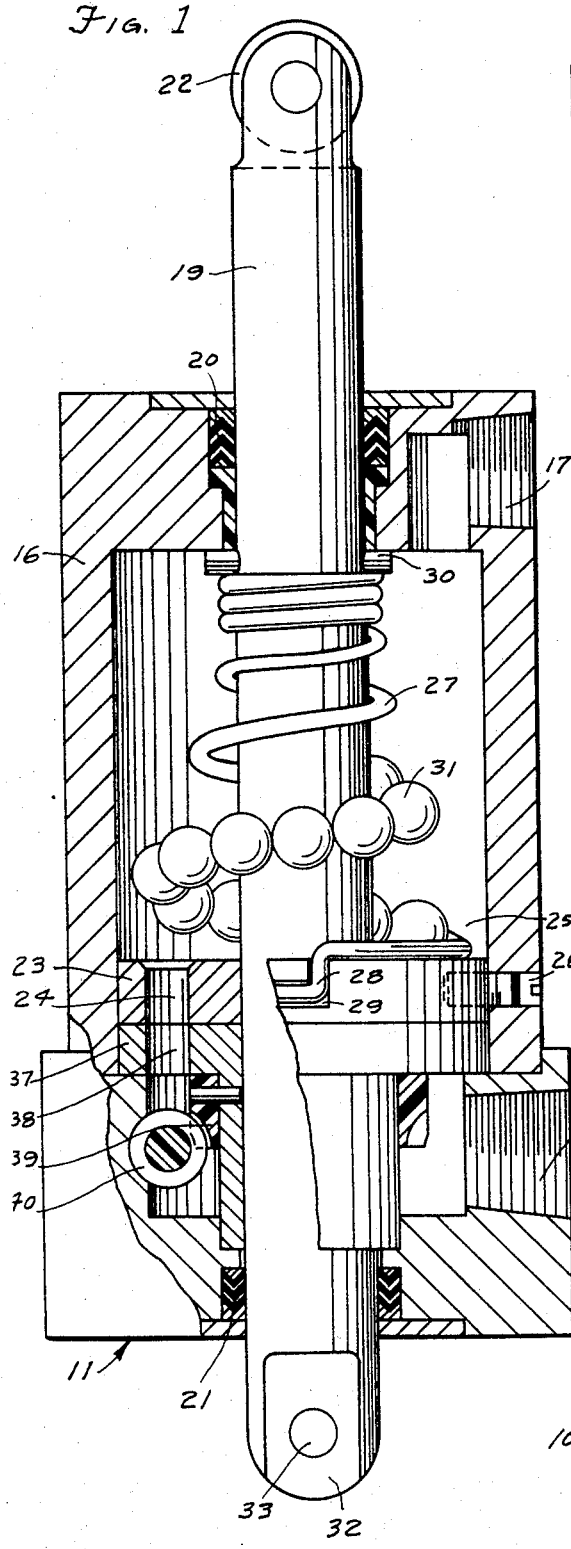
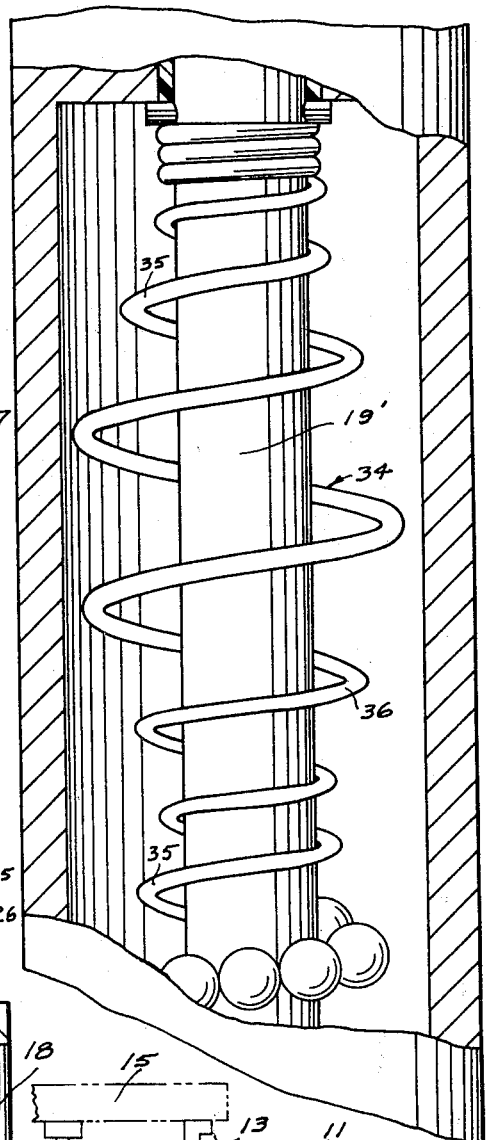
INVENTOR.
EDWARD H. EASTIN
BY Barnes, Kisselle,
Raisch & Choate

United States Patent Office 3,440,931
Patented Apr. 29, 1969

3,440,931
DEACCELERATION VALVE
Edward H. Eastin, 254 Reitman Court,
Rochester, Mich. 48063
Filed Oct. 6, 1967, Ser. No. 673,403
Int. Cl. F15b 15/22; F01b 29/08; F16k 31/38
U.S. Cl. 91—407                   14 Claims

ABSTRACT OF THE DISCLOSURE

The deacceleration valve disclosed herein comprises a cylinder having a shaft of constant diameter reciprocably mounted therein with means on one end of said shaft adapted to engage a constant ratio cam that is operated by a fluid actuator. The cylinder has a plurality of circumferentially spaced openings in one end thereof between longitudinally spaced ports to the chamber of the cylinder. A spring carrier having a plurality of closure members is mounted within the cylinder and is compressed upon operation of the shaft by the cam to progressively bring the balls into engagement with the openings and thereby vary the flow of fluid from one port to the other. The fluid ports are connected respectively to one end of the fluid actuator and to a valve that directs flow from a pressure source or to a reservoir.

Background of the invention

This invention relates to fluid flow control valves and particularly to deacceleration valves.

In the control of fluid actuators such as pistons, it is often desirable to restrict the flow of exhaust fluid from the actuator and thereby vary the speed and particularly the rate at which the actuator stops its motion.

Among the objects of the invention are to provide a deacceleration valve which will effectively control the action of an actuator; which will provide harmonic deacceleration of an actuator; wherein longitudinal forces due to differential fluid pressures on a piston shaft are eliminated; and which is relatively efficient, low in cost and easily maintained.

Description of the drawings

FIG. 1 is a part sectional longitudinal view of a deacceleration valve embodying the invention.

FIG. 2 is a fragmentary longitudinal sectional view of a modified form of deacceleration valve.

FIG. 3 is a diagram of the manner of operation of deacceleration valves embodying the invention.

Description

Referring to FIG. 3, the deacceleration valves embodying the invention are adapted to be used, for example, with a fluid actuator 10 in the form of a cylinder and piston to control the exhaust of fluid from opposite ends of the cylinder. A deacceleration valve 11 is provided in association with each port 12 of the cylinder and is adapted to permit free flow through the port 12 into the actuator 10 but to provide for progressive deacceleration when the fluid is flowing out of each port 12. This is achieved by providing cams 13 which are operatively connected to the shaft 14 of the actuator 10 by a bar 15 so that when the piston of actuator 10 is being moved in a specific direction, the corresponding deacceleration valve 11 is actuated. The deacceleration valves 11 are in turn adapted to be connected to a directional valve for controlling the flow of fluid to or from the deacceleration valves.

Referring to FIG. 1, the deacceleration valve 11 comprises a cylinder 16 that has longitudinally spaced ports 17, 18. A shaft 19 of constant diameter is mounted for reciprocation within the cylinder with the ends thereof projecting beyond the cylinder. Appropriate packing 20, 21 is provided in order to produce a fluid-type seal. One end of shaft 19 has a roller 22 rotatably mounted therein for engagement with the surface of the cam 13. Each cam 13 preferably has a straight cam surface, that is, a surface having a constant ratio.

A first disc 23 having a plurality of circumferentially spaced axial openings 24 is fixed in one end of the chamber 25 of the cylinder 16 by a set screw 26 so that the fluid flowing between ports 17, 18 must flow through one or more of axial passages 24. A closure carrier 27 in the form of a spiral spring has one end 28 thereof bent into an opening 29 of the disc 23 and has the other end thereof tightly wound and abutting against a cross pin 30 through the shaft 19. Closure carrier 27 rotatably supports closure members or balls 31.

When fluid is being supplied to port 18, it flows through axial passages 24 freely to the port 17 and, in turn, to one end of the fluid actuators 10 to move the fluid actuator in one direction. At the same time, fluid flowing out of the other end of the fluid actuator 10 flows to port 17 of the other deacceleration valve 11. Continued movement of the piston of fluid actuator 10 brings the lower cam 13 into engagement with the shaft 19 of the lower deacceleration valve 11 (FIG. 3) moving the shaft 19 to the right as viewed in FIG. 3 or downwardly as viewed in FIG. 1. This compresses the carrier 27 and progressively brings balls 31 on the carrier into engagement with the ends of axial passages 24 thereby interrupting progressively the flow through successive passages 24. This produces a harmonic deacceleration by restricting progressively the flow of fluid out of one end of the actuator 10. Upon reversal of flow through the actuator 10, the carrier 27 performs the additional function of returning the shaft 19 to its original position.

On reversal of flow to the actuator, the upper deacceleration valve similarly comes into operation to successively restrict flow out of the upper end of actuator 10.

Since the shaft 19 is of substantially constant diameter throughout, any longitudinal forces on the shaft due to internal pressure differences is entirely eliminated. The lower end 32 of the shaft has an opening 33 therein providing for connecting to the shaft in the event that it is desired to produce any auxiliary actuating force.

In order to vary the action of the deacceleration valve, an adjustment plate 37 is rotatably mounted beneath the disc 23 and has a plurality of openings 38 which are substantially aligned with the axial passages 24. Plate 37 has a gear 39 fixed thereto which meshes with a worm 40 journalled in the cylinder end and accessible from the exterior so that when the worm 40 is rotated, the plate 37 is also rotated to displace the alignment of the openings 38 with the axial passages 24 thereby varying the effective size of the axial passages.

The carrier and closure members may have the forms as disclosed in my copending application Ser. No. 659,364, filed Aug. 9, 1967.

In the form of the invention shown in FIG. 2, the carrier 34 is wound so that it has portions of varying diameter which will produce a different ratio of movement of the ball closures to movement of the shaft. Speficially, the carrier 34 comprises two spiral portions 35 and an intermediate inverted spiral portion 36. The deacceleration valve shown in FIG. 2 could be used in particular applications where the shaft 19' thereof would be operated directly by the shaft 14 of the fluid actuator.

What is claimed is:
1. The combination comprising
    a fluid actuator having a member movable by the application of fluid to said fluid actuator, said actuator having a fluid outlet,
a cam operated by said actuator,
said cam having a constant ratio camming surface,
and a deacceleration valve comprising
a cylinder,
a shaft mounted for reciprocation within said cylinder,
said shaft having means on one end thereof adapted to be engaged by said cam,
said cylinder having longitudinally spaced ports therein, one of which is connected to said fluid exhaust outlet
a plurality of fluid passages provided in circumferentially spaced relation to said shaft in one end of said cylinder between said ports,
a carrier interposed in said cylinder,
said carrier supporting closure means adapted to progressively engage said passages as the shaft is moved in one direction to restrict the flow through said passages.

2. The combination set forth in claim 1 wherein said carrier comprises a spring having one end thereof fixed to said cylinder and the other end thereof operatively connected to said shaft.

3. The combination set forth in claim 1 wherein said closure means comprises balls on said spring.

4. The combination set forth in claim 1 wherein said shaft extends completely through said cylinder and has a substantially constant diameter in the area thereof within the fluid chamber portion of said cylinder.

5. The combination set forth in claim 1 including means for varying the size of said passages.

6. The combination set forth in claim 5 wherein said last-mentioned means comprises a plate having a plurality of openings therein and means for rotating said plate to vary the alignment of said openings with said passages.

7. The combination set forth in claim 1 wherein said shaft extends entirely through said cylinder,
said shaft having means on the other end thereof for attachment of auxiliary fluid devices.

8. A deacceleration valve comprising
a cylinder,
a shaft mounted for reciprocation within said cylinder,
said shaft having means on one end thereof for forming an operating connection to an external device,
said cylinder having longitudinally spaced ports therein,
a plurality of fluid passages provided in circumferentially spaced relation to said shaft in one end of said cylinder between said ports,
a carrier interposed in said cylinder,
said carrier supporting closure means adapted to progressively engage said passages as the shaft is moved in one direction to restrict the flow through said passages.

9. The combination set forth in claim 8 wherein said carrier comprises a spring having one end thereof fixed to said cylinder and the other end thereof operatively connected to said shaft.

10. The combination set forth in claim 9 wherein said closure means comprises balls on said spring.

11. The combination set forth in claim 8 wherein said shaft extends completely through said cylinder and has a substantially constant diameter in the area thereof within the fluid chamber portion of said cylinder.

12. The combination set forth in claim 8 including means for varying the size of said passages.

13. The combination set forth in claim 12 wherein said last-mentioned means comprises a plate having a plurality of openings therein and means for rotating said plate to vary the alignment of said openings with said passages.

14. The combination set forth in claim 8 wherein said shaft extends entirely through said cylinder,
said shaft having means on the other end thereof for attachment of auxiliary fluid devices.

References Cited
UNITED STATES PATENTS

| | | | |
|---|---|---|---|
| 672,033 | 4/1901 | Crandall | 16—53 |
| 2,893,354 | 7/1959 | Austin et al. | 91—407 |

EDGAR W. GEOGHEGAN, *Primary Examiner.*

U.S. Cl. X.R.

251—48; 16—53; 92—143; 60—52